United States Patent
Racelis et al.

(10) Patent No.: US 9,388,733 B2
(45) Date of Patent: Jul. 12, 2016

(54) METHODS AND SYSTEM FOR INFERRING THROTTLE INLET PRESSURE

(71) Applicant: Ford Global Technologies, LLC, Dearborn, MI (US)

(72) Inventors: Rommel Racelis, Ann Arbor, MI (US); John Eric Rollinger, Sterling Heights, MI (US); David Bell, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 53 days.

(21) Appl. No.: 14/146,646

(22) Filed: Jan. 2, 2014

(65) Prior Publication Data

US 2015/0184583 A1 Jul. 2, 2015

(51) Int. Cl.
*F02D 23/00* (2006.01)
*F02B 33/44* (2006.01)
*F02B 33/00* (2006.01)
*F02B 37/18* (2006.01)
*F02D 41/00* (2006.01)
*F02D 41/22* (2006.01)

(52) U.S. Cl.
CPC ............ *F02B 37/18* (2013.01); *F02D 41/0007* (2013.01); *F02D 41/222* (2013.01); *F02D 2200/0402* (2013.01); *F02D 2200/0404* (2013.01); *F02D 2200/0406* (2013.01); *Y02T 10/144* (2013.01); *Y02T 10/40* (2013.01)

(58) Field of Classification Search
CPC ........ F02B 37/18; F02B 33/446; F02B 37/00; F02B 37/16; Y02T 10/144; F02D 41/0007; F02D 41/222; F02D 2200/0402; F02D 220/0404
USPC .................................. 60/602, 605.1; 701/102
See application file for complete search history.

(56) References Cited

U.S. PATENT DOCUMENTS

| | | | |
|---|---|---|---|
| 5,771,861 A * | 6/1998 | Musser et al. | 701/104 |
| 6,698,203 B2 | 3/2004 | Wang | |
| 7,047,740 B2 | 5/2006 | Fukasawa et al. | |
| 7,305,301 B1 | 12/2007 | Wang et al. | |
| 2014/0150756 A1 * | 6/2014 | Smith et al. | 123/563 |

* cited by examiner

*Primary Examiner* — Thai Ba Trieu
*Assistant Examiner* — Ngoc T Nguyen
(74) *Attorney, Agent, or Firm* — Julia Voutyras; Alleman Hall McCoy Russell & Tuttle LLP

(57) ABSTRACT

Embodiments for controlling boost pressure in a turbocharged engine are provided. In one embodiment, a method for an engine having a throttle comprises, if an inferred throttle inlet pressure (TIP) value is different than a measured TIP value, adjusting a wastegate of a turbocharger based on the inferred TIP value and not based on the measured TIP value, the inferred TIP value based on air flow through the throttle, throttle angle, and manifold absolute pressure (MAP). In this way, boost pressure control may be provided by the inferred TIP value under some conditions.

17 Claims, 4 Drawing Sheets

METHODS AND SYSTEM FOR INFERRING THROTTLE INLET PRESSURE

FIELD

The present disclosure relates to a turbocharged engine system.

BACKGROUND AND SUMMARY

Turbocharging an engine allows the engine to provide power similar to that of a larger displacement engine while engine pumping work is maintained near the pumping work of a normally aspirated engine of similar displacement. Thus, turbocharging can extend the operating region of an engine. Turbochargers function by compressing intake air via a compressor driven by a turbine operated by exhaust gas flow. The amount of compression provided by the turbocharger (referred to as boost pressure) may be regulated by adjusting the position of a wastegate coupled across the turbine, based on feedback from a throttle inlet pressure (TIP) sensor positioned in the intake upstream of the throttle and downstream of the compressor.

If the throttle inlet pressure sensor is degraded, for example if the throttle inlet sensor is stuck in range and is outputting a constant signal even as throttle inlet pressure changes, the engine boost pressure control routine may continue to adjust the position of the wastegate even after target boost pressure has been achieved. Under some conditions, this may result in engine knock and/or engine damage if the wastegate continues to be moved to a more closed position than indicated and thus the intake air is compressed more than desired.

The inventors herein have recognized that standard throttle inlet pressure sensor diagnostics can take a relatively long time to recognize throttle inlet pressure sensor degradation. During the time that the diagnostic routine is being executed, overboost conditions may occur leading to engine knock and/or engine damage. Accordingly, a method is provided to at least partly address the issues with the above approach. In one embodiment, a method for an engine having a throttle comprises, if an inferred throttle inlet pressure (TIP) value is different than a measured TIP value, adjusting a wastegate of a turbocharger based on the inferred TIP value and not based on the measured TIP value, the inferred TIP value based on air flow through the throttle, throttle angle, and manifold absolute pressure (MAP).

In this way, an inferred TIP value may be estimated based on engine operating parameters other than the actual throttle inlet pressure. The inferred TIP value may be substituted for the measured TIP value if the values differ, until the TIP sensor diagnostic routine detects degradation of the TIP sensor. By doing so, engine knock and/or damage that may occur before the diagnostic routine detects degradation of the TIP sensor may be avoided.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Engine systems include a variety of sensors that collect data relating to operating parameters of the engine, and the output from the sensors may be used by the engine control system to maintain desired engine operation. To ensure the sensors are functioning, various diagnostic routines and/or rationality checks may be periodically performed on the sensors. However, such routines may be time-consuming and/or may only be configured to run during certain operating conditions. Thus, if a sensor is actually degraded, the time lapse prior to and during the execution of the diagnostic routine may lead to disruption of the engine control strategies. In some cases, such as when a throttle inlet pressure (TIP) sensor is degraded, the loss of boost control can lead to engine combustion issues, such as knock, and possibly engine damage.

Figure 1:
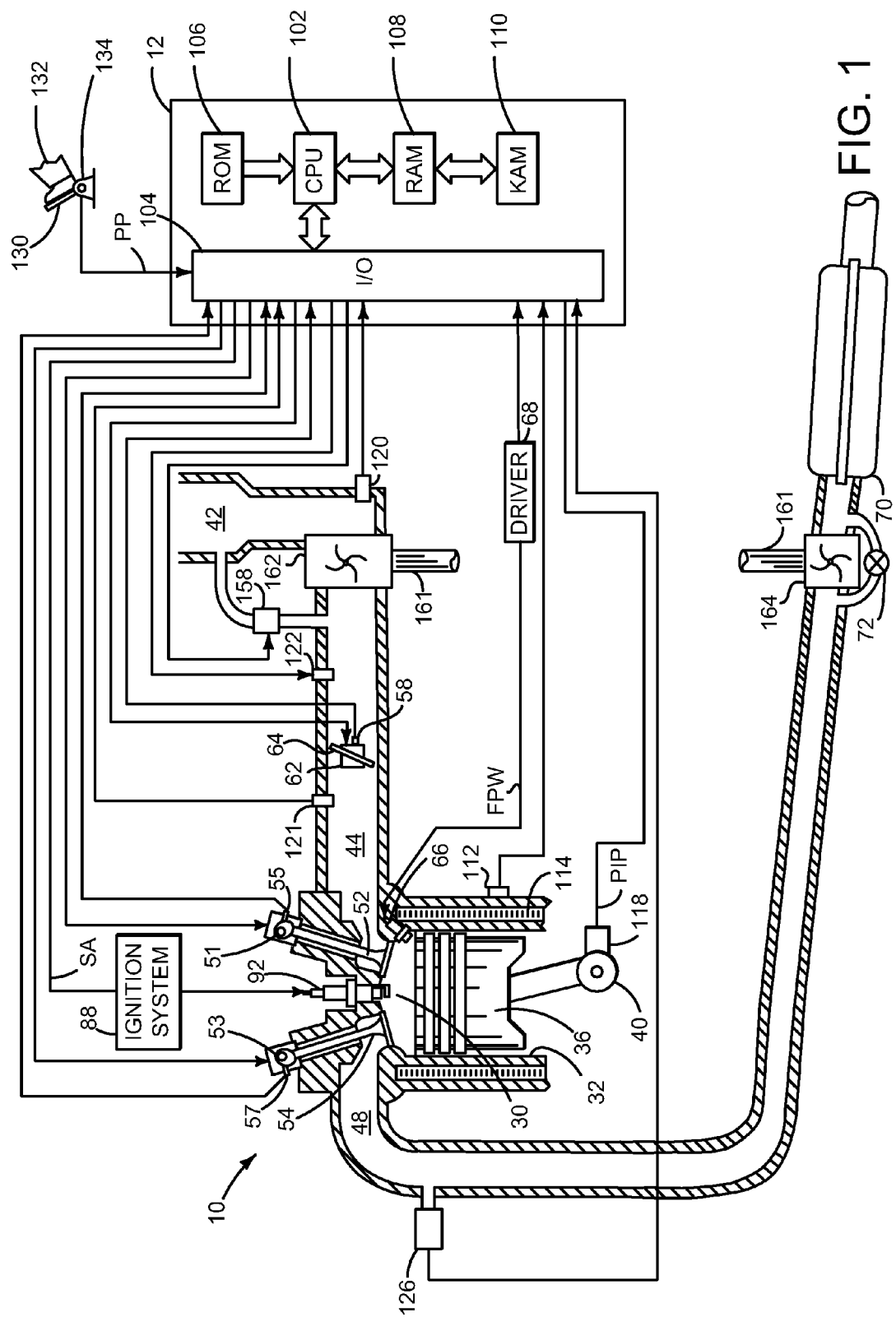
FIG. 1 shows a schematic diagram of an engine.

According to embodiments disclosed herein, the throttle inlet pressure may be continuously inferred based on operating parameters including MAP, throttle angle, and air flow through the throttle. Under some conditions, such as when the inferred TIP value is outside a threshold range of the TIP value measured by the TIP sensor, the inferred TIP value may be substituted for the measured TIP value. As such, during the run time of the TIP sensor diagnostic routine, the boost control strategy of the engine may be maintained using the inferred TIP value. FIG. 1 shows an engine including a turbocharger, TIP sensor, and controller. The controller may be configured to execute the methods illustrated in FIGS. 2-3B.

Referring specifically to FIG. 1, it includes a schematic diagram showing one cylinder of multi-cylinder internal combustion engine 10. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP.

Combustion cylinder 30 of engine 10 may include combustion cylinder walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion cylinder 30 may receive intake air from intake manifold 44 via intake passage 42 and may exhaust combustion gases via exhaust passage 48. Intake manifold 44 and exhaust passage 48 can selectively communicate with combustion cylinder 30 via respective intake valve 52 and exhaust valve 54. In some embodiments, combustion cylinder 30 may include two or more intake valves and/or two or more exhaust valves.

In this example, intake valve 52 and exhaust valve 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion cylinder 30 for injecting fuel directly therein in proportion to the pulse width of signal FPW received from controller 12 via electronic driver 68. In this manner, fuel injector 66 provides what is known as direct injection of fuel into combustion cylinder 30. The fuel injector may be mounted on the side of the combustion cylinder or in the top of the combustion cylinder, for example. Fuel may be delivered to fuel injector 66 by a fuel delivery system (not shown) including a fuel tank, a fuel pump, and a fuel rail. In some embodiments, combustion cylinder 30 may alternatively or additionally include a fuel injector arranged in intake passage 42 in a configuration that provides what is known as port injection of fuel into the intake port upstream of combustion cylinder 30.

Intake passage 42 may include a throttle 62 having a throttle plate 64. In this particular example, the position of throttle plate 64 may be varied by controller 12 via a signal provided to an electric motor or actuator included with throttle 62, a configuration that may be referred to as electronic throttle control (ETC). In this manner, throttle 62 may be operated to vary the intake air provided to combustion cylinder 30 among other engine combustion cylinders. Intake passage 42 may include a mass air flow sensor 120 and a manifold air pressure sensor 121 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 upstream of catalytic converter 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a $NO_x$, HC, or CO sensor. The exhaust system may include light-off catalysts and underbody catalysts, as well as exhaust manifold, upstream, and/or downstream air-fuel ratio sensors. Catalytic converter 70 can include multiple catalyst bricks, in one example. In another example, multiple emission control devices, each with multiple bricks, can be used. Catalytic converter 70 can be a three-way type catalyst in one example.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. The controller 12 may receive various signals and information from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor 58; absolute manifold pressure signal, MAP, from sensor 121, and throttle inlet pressure (TIP) from sensor 122. As sensor 122 is downstream of a compressor (explained below), it may be used to determine the boost pressure provided by the turbocharger. Manifold pressure signal MAP from a manifold pressure sensor may be used to provide an indication of vacuum, or pressure, in the intake manifold 44. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft 40. In some examples, storage medium read-only memory 106 may be programmed with computer readable data representing instructions executable by processor 102 for performing the methods described below as well as other variants that are anticipated but not specifically listed.

Engine 10 may further include a compression device such as a turbocharger or supercharger including at least a compressor 162 arranged along intake passage 42. For a turbocharger, compressor 162 may be at least partially driven by a turbine 164, via, for example a shaft 161, or other coupling arrangement. The turbine 164 may be arranged along exhaust passage 48. Various arrangements may be provided to drive the compressor. For a supercharger, compressor 162 may be at least partially driven by the engine and/or an electric machine, and may not include a turbine. Thus, the amount of compression provided to one or more cylinders of the engine via a turbocharger or supercharger may be varied by controller 12. In some cases, the turbine 164 may drive, for example, an electric generator, to provide power to a battery via a turbo driver. Power from the battery may then be used to drive the compressor 162 via a motor. Additionally, in some embodiments the turbocharger may be a variable geometry turbocharger.

Further, exhaust passage 48 may include wastegate 72 for diverting exhaust gas away from turbine 164. Additionally, intake passage 42 may include a compressor bypass valve 158 configured to divert intake air around compressor 162. Wastegate 72 and/or CBV 158 may be controlled by controller 12 to be opened when a lower boost pressure is desired, for example. Thus, the amount of compression (e.g., boost) provided to one or more cylinders of the engine via a turbocharger or supercharger may be varied by controller 12, based on feedback from various sensors, such as TIP sensor 122.

As explained previously, the position of wastegate 72 may be controlled to provide a desired amount of boost pressure to the engine. Boost pressure may be measured by TIP sensor 122. Thus, wastegate position 72 may be adjusted based on feedback from TIP sensor 122. In one example, if an increase in boost pressure is desired, the wastegate 72 may be adjusted to a more closed position until the boost pressure downstream of compressor 162 is at a desired boost pressure, as indicated based on feedback from TIP sensor 122. However, if TIP sensor 122 is degraded, it may provide inaccurate indications of the actual boost pressure upstream of throttle 62. As such, the wastegate 72 may be continued to be moved to the more closed position, increasing the boost pressure. This can cause an overboost condition that may result in engine knock or engine damage, for example. To protect the engine from overboost resulting from a degraded TIP sensor, a rationality check or diagnostic routine may be carried out to check that the TIP sensor is functioning as desired. For example, a diagnostic routine may include commanding the wastegate to change position in order to cause a change in throttle inlet pressure, and monitoring the output of the TIP sensor to ensure it changes in correspondence to the commanded change in wastegate position. If the diagnostic routine indicates degradation of the TIP sensor, turbocharger operation may be temporarily suspended, or adjustment to the level of boost may be made based on feedback from sensors other than the TIP sensor, such as the MAP sensor, pressure drop across the turbine, etc., until the TIP sensor is serviced.

However, such a routine may take a relatively long time to complete (e.g., five seconds). During the run time of the diagnostic routine, if the engine boost control strategy continues to rely on feedback from the TIP sensor for making adjustments to the wastegate position to achieve a desired level of boost, an overboost or underboost condition may occur if the TIP sensor is actually degraded, leading to combustion issues and possibly engine damage. To prevent such issues, an inferred TIP value may be substituted for the measured TIP value from the TIP sensor. The inferred TIP value may be determined using information already present in the engine control strategy for determining the desired throttle angle, as explained in more detail below with respect to FIGS. 2-3B.

Thus, the system for FIG. 1 provides for a system, comprising: an engine; a turbocharger fluidically coupled to the engine; a wastegate coupled across a turbine of the turbocharger; a throttle positioned upstream of the engine and controlling air flow to the engine; and a controller storing non-transitory instructions executable to: adjust an initial position of the wastegate based on feedback from a throttle inlet pressure (TIP) sensor positioned upstream of the throttle; calculate an inferred TIP value and compare it to a measured TIP value from the TIP sensor; and if the inferred TIP value is different than the measured TIP value, adjust a subsequent position of the wastegate based on the inferred TIP value.

The inferred TIP value may be calculated based on a throttle model that estimates TIP from throttle angle, air flow through the throttle, and manifold absolute pressure. The air flow through the throttle may be calculated based on a rate of change of manifold absolute pressure.

Figure 2:
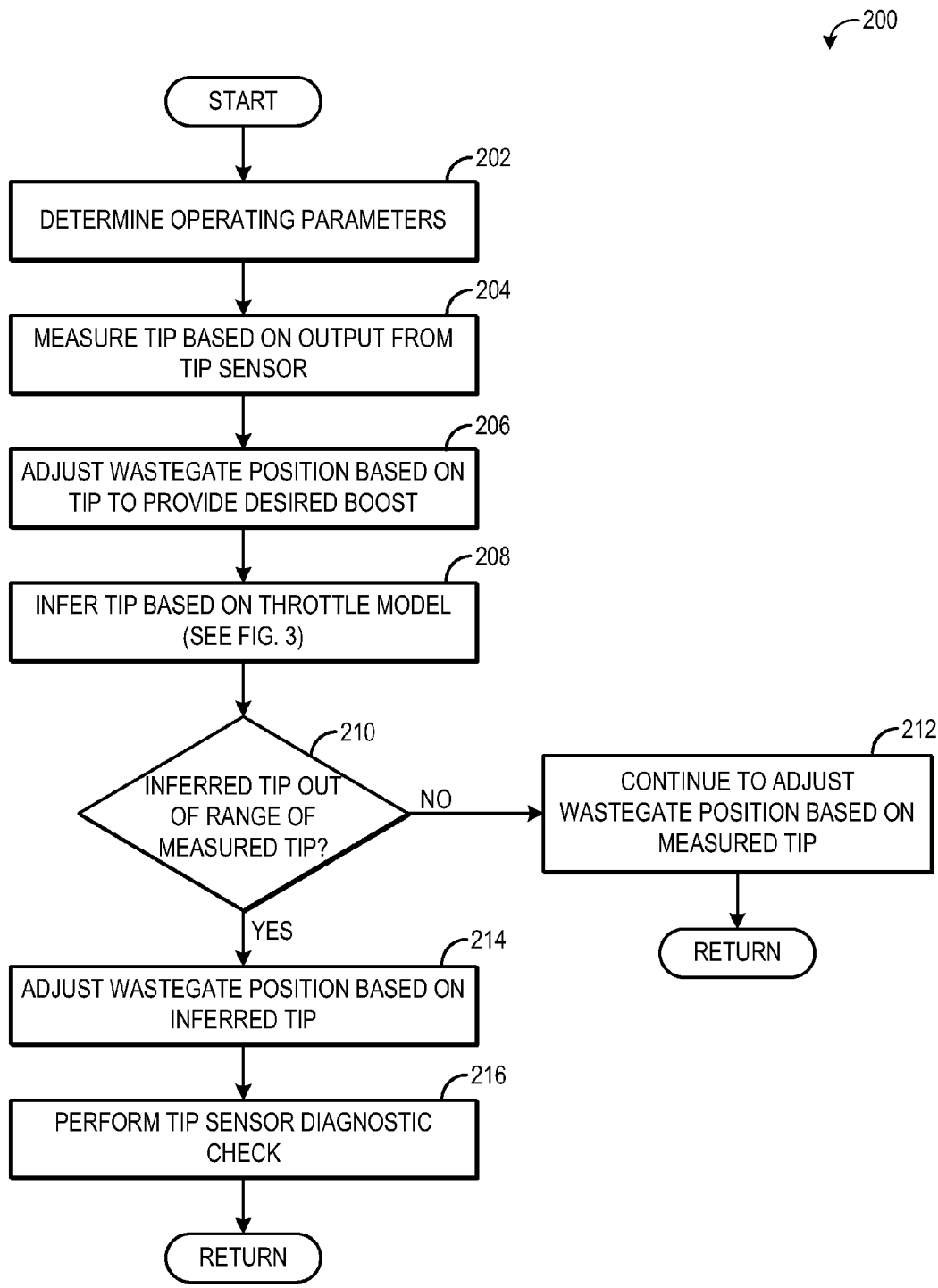
FIG. 2 is a flow chart illustrating a high-level method for controlling boost pressure based on throttle inlet pressure.

FIG. 2 is a flow chart illustrating a method 200 for adjusting a wastegate position based on a throttle inlet pressure (TIP) value. Method 200 may be carried out by an engine controller according to non-transitory instructions stored thereon. Method 200 may be carried out with components of an engine system such as the system of FIG. 1, including controller 12, wastegate 72, and TIP sensor 122.

At 202, method 200 includes determining engine operating parameters. The determined operating parameters may include, but are not limited to, throttle inlet pressure (as determined by TIP sensor 122), MAP as determined by MAP sensor 121, throttle angle, engine speed and load, desired boost pressure, wastegate position, and other parameters. At 204, throttle inlet pressure is measured based on output from the TIP sensor. At 206, the wastegate position is adjusted based on the measured TIP, if indicated, to provide desired boost pressure.

At 208, throttle inlet pressure is also inferred based on a throttle model that calculates air flow through the throttle and uses the calculated air flow, along with MAP and throttle angle, to estimate throttle inlet pressure. Specifically, the look-up tables that the controller uses to calculate throttle angle from throttle air flow, throttle inlet pressure, and MAP may be utilized to infer TIP given a known throttle angle, MAP, and throttle air flow. The details of inferring throttle inlet pressure will be presented below with respect to FIGS. 3A and 3B.

The inference of throttle inlet pressure may be performed continuously, such that all measured throttle inlet pressure values based on the TIP sensor output may be compared to the inferred TIP values, as described herein in more detail below. However, in some embodiments, the inferred TIP value may be calculated only during certain operating periods, such as when the TIP sensor diagnostic/rationality check routine is being performed and/or when other collected sensor data indicates the TIP sensor may be degraded.

Upon determining the inferred TIP value, method 200 proceeds to 210 to determine if the inferred TIP value is out of a threshold range of the measured TIP value. That is, at a given time point, the throttle inlet pressure may be both measured by the TIP sensor and inferred by the throttle model. The two TIP values may be compared to determine if the values differ by more than a threshold amount. The threshold range may be a suitable range. For example, the inferred TIP range may be considered to be equal to the measured value if the inferred TIP value is within 5% of the measured value in one example, or within 10% of the measured value in another example. Thus, if the inferred TIP value is more than 5 or 10% different than the measured TIP value, the two values may be considered different.

If the two values are not different, that is if the inferred TIP value is within the threshold range of the measured TIP value, method 200 proceeds to 212 to continue to adjust the wastegate position based on feedback from the TIP sensor, and then method 200 proceeds to 216, explained below.

If the two values are different, method 200 proceeds to 214 to adjust the wastegate position based on the inferred TIP value (and subsequent inferred TIP values) and not based on the measured TIP value. At 216, the TIP sensor rationality check/diagnostic routine is performed. During the duration of the rationality check, the inferred TIP values continue to be used to adjust wastegate position, if the inferred TIP value is determined to be different than the measured TIP value. However, if the measured TIP value and inferred TIP value are not different, the measured TIP value may be used to control the wastegate position during the rationality check in some embodiments. However, in other embodiments, during the rationality check, even if the measured TIP value and inferred TIP values are equal, the inferred TIP values may be substituted for the measured TIP values.

If the rationality check confirms that the TIP sensor is degraded, the controller may take a default action, including notifying a vehicle operator (via a malfunction indicator lamp), setting a diagnostic code, and/or adjusting the boost control strategy (e.g., by disabling turbocharger operation or by controlling wastegate position based on other sensor data).

Thus, according to the method described above, the inferred TIP may be substituted for the measured TIP when the TIP values differ by more than a threshold amount, at least during time period leading up to and during a rationality check. However, in some embodiments, if the inferred TIP value and measured TIP value are different, but differ by less than the threshold amount, the inferred TIP value and measured TIP value may be blended to produce a blended TIP value that is then used to control the wastegate position. In one example, if the measured TIP value is significantly lower than the inferred TIP value, the inferred and measured TIP values may blended according to a blending factor table that blends the two TIP values depending on the error between the two values. For example, if the error (e.g., difference between the inferred and measured values) is relatively large, e.g., 10 inHg, the inferred TIP values starts getting blended in to the measured TIP value. At a large enough error, e.g., 12 inHg, the inferred TIP value is fully substituted for the measured TIP value. A hysteresis band may be used to avoid having a noisy blending factor for either a noisy estimate or sensor reading. As such, when the inferred TIP value differs from the measured TIP value by more than the threshold amount, the sensor is indicated as degraded, and a separate rationality check is not necessarily performed.

Figure 3A:
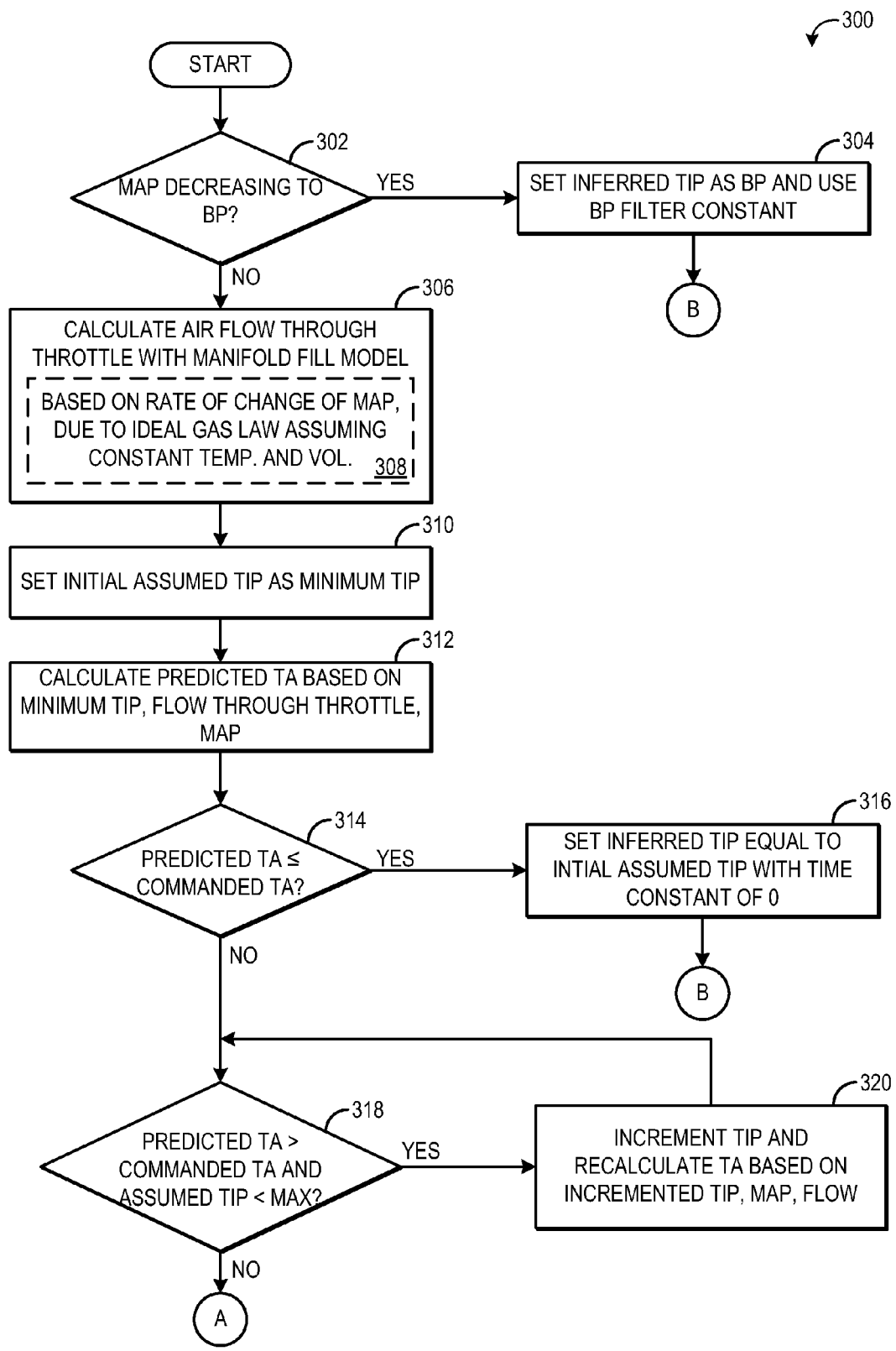
FIGS. 3A-3B show a flow chart illustrating a method for inferring a throttle inlet pressure value.
Figure 3B:
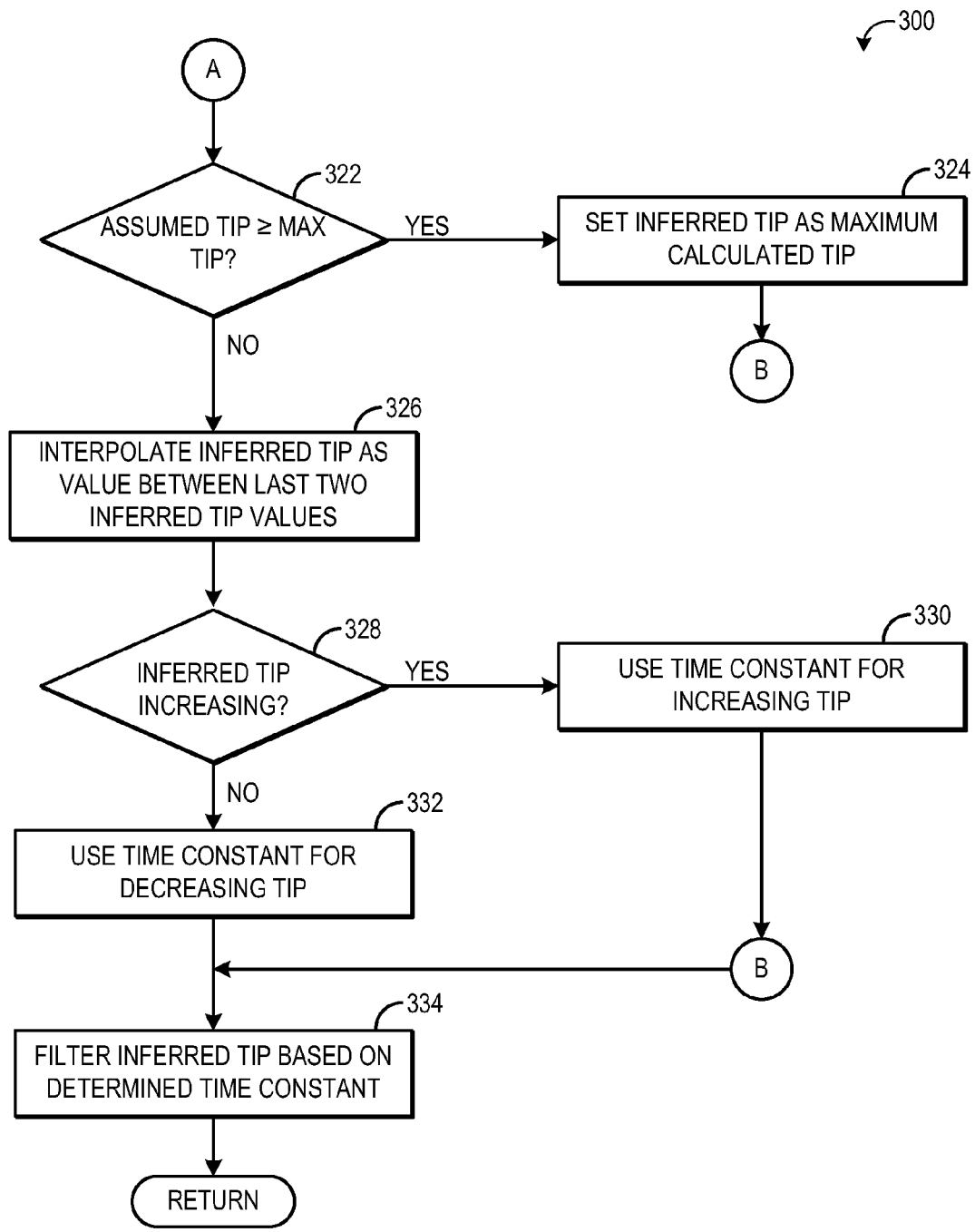

Turning now to FIGS. 3A-3B, a method 300 for inferring a throttle inlet pressure value based on a throttle model is presented. Method 300 may be carried out during the execution of method 200 in order to control the turbocharger wastegate during at least the duration of the TIP sensor rationality check using the inferred TIP value.

At 302, method 300 determines if MAP is decreasing towards barometric pressure (BP). That is, at 302 the method judges if MAP is decreasing and if MAP is near BP. If so, MAP is most likely decreasing to BP and thus method 300 proceeds to 304 to set the inferred TIP value as barometric pressure and use a BP filter constant during a filtering step, explained below. Method 300 then proceeds to 334, which will be described in more detail below.

If the MAP is not dropping to BP, method 300 proceeds to 306 to calculate the air flow through the throttle using a manifold filling model. The manifold filling model uses the ideal gas law to demonstrate that the rate of change in the intake manifold absolute pressure (MAP) is due to the difference in flows going in (throttle) and out (cylinder) of the manifold, as indicated at 308.

Thus, the rate of change of the MAP is equal to the rate of change of the mass of the air flow through the throttle multiplied by the temperature and volume of the intake passage and the ideal gas constant. Accordingly, assuming temperature and volume are relatively constant, the change in pressure is due to change in mass. However, if temperature is changing, the change in temperature may be accounted for in the model. Further, assuming no leaks, the change in mass is due to difference in flows in and out of the manifold, and thus dP/dt=(throt_flow−cyl_flow)*RT/V. The equation may be rearranged to give throt_flow=cyl_flow+dP/dt*V/(RT), where V/(RT) is constant and thus the air flow through the throttle is dependent on the rate of change of MAP.

After the air flow through the throttle is calculated, a simple hunting mechanism is used on the throttle model to infer the TIP value. The standard usage of the throttle model is for determining throttle angle (TA) given flow, TIP, and MAP. The model characterization tables in the controller are set up to support this usage. To perform the hunting mechanism, TIP is assigned an assumed value, and that value is plugged into the throttle model to calculate a throttle angle. The calculated throttle angle is compared against the actual current, commanded throttle angle, and if the throttle angles are different, the assumed TIP value is adjusted and the throttle angle is recalculated until a TIP value is reached that provides a calculated throttle angle that is relatively near the actual throttle angle.

The initial assumed TIP value may be any TIP value. However, to simplify the hunting process, the initial assumed TIP value may be a minimum or lowest-possible TIP value, in order to provide adjustments to the assumed TIP value in only one direction. For example, the initial assumed TIP value may be set as MAP or BP, as TIP cannot be lower than MAP. Thus, as indicated at 310, the initial assumed TIP is set as the minimum TIP.

At 312, method 300 includes calculating a predicted throttle angle based on the minimum TIP, flow through the throttle, and MAP by using the throttle model tables stored in the controller. At 314, the predicted throttle angle is compared to the commanded throttle angle to determine if the predicted throttle angle is less than or equal to the commanded throttle angle. If the predicted TA is less than or equal to the commanded TA, method 300 proceeds to 316 to set the inferred TIP value as equal to the initial assumed TIP and set the time constant to zero. Method 300 then proceeds to 334. If the predicted TA is not less than or equal to the commanded TA, method 300 proceeds to 318 to determine if the predicted TA is greater than the commanded TA and if the assumed TIP is less than a maximum possible TIP. The maximum possible TIP may be based on the configuration of the engine and turbocharger and/or engine operating parameters, such as engine speed and load. If the assumed TIP is not less than the maximum TIP, method 300 proceeds to 322, explained below.

If the predicted TA is greater than the commanded TA and the assumed TIP is less than maximum, method 300 proceeds to 320 to increment the assumed TIP and recalculate throttle angle based on the incremented TIP, throttle air flow, and MAP. The assumed TIP may be incremented by a suitable amount. In one example, the assumed TIP may be incremented by a fixed amount, such as one kPa. In another example, the assumed TIP may be incremented by an amount that varies based on engine speed. For example, if engine speed is high, the assumed TIP may be incremented by a larger amount than if engine speed is low, to minimize the processing power used to perform the calculations at the higher engine speeds, where more calculations are performed by the processor at a faster rate, for example. Additionally or alternatively, the assumed TIP may be incremented by an amount based on the processor idle time, number of injections, or other suitable factor that indicates how heavily the processor is taxed or how accurate a result is desired.

After the TA is recalculated, method 300 loops back to 318 to again determine if the predicted TA is greater than the commanded TA. The incrementing of the assumed TIP and recalculation of the throttle angle may be repeated until the predicted TA is no longer greater than the commanded TA, at which point method 300 proceeds to 322.

At 322, it is determined if the assumed TIP is greater than or equal to the maximum TIP. If yes, method 300 proceeds to 324 to set the inferred TIP as the maximum TIP, and method 300 proceeds to 334. If the assumed TIP (that is, the assumed TIP that provided a predicted throttle angle that is less than or equal to the actual throttle angle, as determined above) is less than the maximum TIP, method 300 proceeds to 326 to interpolate the inferred TIP value as a value between the previously two assumed TIP values. For good coding practice, this calculation has a divide by zero protection that holds the last value if the denominator in an equation is zero. At 328, it is determined if the inferred TIP is increasing or decreasing, by monitoring the change in the inferred TIP from previously-inferred TIPs. If the inferred TIP is increasing, method 300 proceeds to 330 to use the time constant for an increasing TIP, while if the inferred TIP is not increasing, method 300 proceeds to 332 to use the time constant for the decreasing TIP. Both 330 and 332, as well as 324, 316, and 304, proceed to 334 where, if indicated, the inferred TIP is filtered based on the determined time constant. By using increasing or decreasing time constants, the difference between the filling/emptying aspects of boost build and decay may be modeled. In doing so, an accurate match between actual performance and modeled performance may be achieved. Method 300 then returns.

Thus, method 300 provides for inferring a throttle inlet pressure using a throttle model. The throttle model is typically set up to calculate throttle angle given measured TIP, MAP, and calculated throttle air flow. By starting with an initial assumed TIP value, the model may be used to calculate a predicted throttle angle that is compared to the actual throttle angle commanded by the controller. If the predicted and commanded throttle angles are different, the initial assumed TIP is adjusted (e.g., incrementally increased) until an assumed TIP value is found that provides a predicted TA that is equal to the commanded TA. This assumed TIP is then set as the inferred TIP. If the final incremented TIP provides for a predicted TA that is less than the commanded TA (that is, if the TIP is incremented from a first TIP that provides a predicted TA that is greater than the commanded TA to a second TIP that provides a predicted TA that is less than the commanded TA), a TIP value between the first TIP and second TIP may be used as the inferred TIP.

The inferred TIP may be compared to the measured TIP. If the two TIP values are different, the inferred TIP value may be substituted for the measured TIP value, at least until a rationality check or diagnostic routine is run on the TIP sensor to ensure the TIP sensor is not degraded. In doing so, engine combustion engines can be avoided when the TIP sensor is degraded while the TIP sensor diagnostic routine is being performed.

Thus, in an embodiment, a method for an engine having a throttle comprises, if an inferred throttle inlet pressure (TIP) value is different than a measured TIP value, adjusting a wastegate of a turbocharger based on the inferred TIP value and not based on the measured TIP value, the inferred TIP value based on air flow through the throttle, throttle angle, and manifold absolute pressure (MAP).

The method may further comprise determining the measured TIP value based on output from a TIP sensor positioned upstream of the throttle. If the inferred TIP value is different than the measured TIP value, the method may further comprise performing a sensor rationality check on the TIP sensor. If TIP sensor degradation is confirmed by the sensor rationality check, the wastegate may continue to be adjusted based on subsequent inferred TIP values. If TIP sensor degradation is not confirmed by the sensor rationality check, the wastegate may be adjusted based on subsequent measured TIP values.

The flow through the throttle may be determined based on a cylinder filling model that determines flow through the throttle based on change in MAP. Inferring the TIP value may comprise: setting a first assumed TIP value to be equal to MAP; calculating throttle angle based on the first assumed TIP value, flow through the throttle, and MAP; comparing the calculated throttle angle to a commanded throttle angle; and if the calculated throttle angle is less than or equal to the commanded throttle angle, setting the first assumed TIP value as the inferred TIP value. If the calculated throttle angle is greater than the commanded throttle angle, inferring the TIP value may include incrementally increasing the first assumed TIP value and recalculating the throttle angle until the first assumed TIP value has been incremented to a second assumed TIP value that results in the calculated throttle angle being less than or equal to the actual throttle angle. If the second assumed TIP value results in the calculated throttle angle being equal to the actual throttle angle, the second assumed TIP value may be set as the inferred TIP value. If the second assumed TIP value results in the calculated throttle angle being less than the actual throttle angle, the inferred TIP value may be interpolated as being between a previous two assumed TIP values. If the inferred TIP value is equal to the measured TIP value, the method may include adjusting the wastegate based on the measured TIP value.

Another embodiment for a method for a turbocharged engine having a throttle comprises inferring throttle inlet pressure (TIP) based on air flow through the throttle, throttle angle, and manifold absolute pressure (MAP); measuring TIP with a TIP sensor positioned upstream of the throttle; if the inferred TIP is within a threshold range of the measured TIP, adjusting boost pressure of the engine based on the measured TIP; and if the inferred TIP is outside the threshold range of the measured TIP, adjusting boost pressure based on the inferred TIP.

Inferring TIP based on air flow through the throttle, throttle angle, and MAP may further comprise: determining the flow through the throttle based on a rate of change of MAP; initially assuming the inferred TIP is equal to a lowest possible TIP; calculating a predicted throttle angle based on the lowest possible TIP, flow through the throttle, and MAP; comparing the predicted throttle angle to a commanded throttle angle; if the predicted throttle angle is less than or equal to the commanded throttle angle, confirming that the inferred TIP is lowest possible TIP; and if the calculated throttle angle is greater than the commanded throttle angle, incrementally increasing the assumed TIP from the lowest possible TIP and recalculating the predicted throttle angle until the assumed TIP has been incremented to a final assumed TIP value that results in the calculated throttle angle being equal to the actual throttle angle.

The lowest possible TIP may be MAP or barometric pressure. Incrementally increasing the assumed TIP may comprise incrementally increasing the assumed TIP by an amount based on engine speed. Adjusting boost pressure may comprise adjusting a position of a wastegate coupled across a turbine of the turbocharger. The method may further comprise, if the inferred TIP is outside the threshold range of the measured TIP, performing a rationality check of the TIP sensor to determine if the TIP sensor is degraded.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and nonobvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine having a throttle and a turbocharger with a wastegate, comprising:
    determining, via a controller, an inferred throttle inlet pressure (TIP) value based on sensors indicating air flow through the throttle, throttle angle, and manifold absolute pressure (MAP);
    measuring a TIP value with a TIP sensor;
    comparing the measured TIP value with the inferred TIP value;
    when the inferred TIP value is different than the measured TIP value, adjusting the wastegate via the controller based on the inferred TIP value and not based on the measured TIP value.

2. The method of claim 1, wherein when the inferred TIP value is different than the measured TIP value, the method further comprises the controller performing a sensor rationality check on the TIP sensor to determine if TIP sensor degradation has occurred.

3. The method of claim 2, further comprising when TIP sensor degradation is confirmed by the sensor rationality check, adjusting the wastegate based on subsequently determined inferred TIP values.

4. The method of claim 2, further comprising when TIP sensor degradation is not confirmed by the sensor rationality check, adjusting the wastegate based on measured TIP values.

5. The method of claim 1, further comprising determining the air flow through the throttle based on a cylinder filling model calculated by the controller that determines air flow through the throttle based on a change in MAP as determined by the MAP sensor and the controller.

6. The method of claim 1, wherein inferring the TIP value comprises:
    setting a first assumed TIP value to be equal to MAP;
    calculating via the controller a throttle angle based on the first assumed TIP value, air flow through the throttle, and MAP;
    comparing the calculated throttle angle to a commanded throttle angle; and
    if the calculated throttle angle is less than or equal to the commanded throttle angle, setting the first assumed TIP value as the inferred TIP value.

7. The method of claim 6, further comprising sensing an actual throttle angle, if the calculated throttle angle is greater than the commanded throttle angle, incrementally increasing the first assumed TIP value and recalculating the throttle angle via the controller until the first assumed TIP value has been incremented to a second assumed TIP value that results in the calculated throttle angle being less than or equal to the actual throttle angle.

8. The method of claim 7, further comprising, if the second assumed TIP value results in the calculated throttle angle being equal to the actual throttle angle, setting the second assumed TIP value as the inferred TIP value.

9. The method of claim 7, further comprising, if the second assumed TIP value results in the calculated throttle angle being less than the actual throttle angle, interpolating the inferred TIP value as being between a previous two assumed TIP values.

10. The method of claim 1, further comprising, if the inferred TIP value is equal to the measured TIP value, adjusting the wastegate based on the measured TIP value.

11. A method for a turbocharged engine having a throttle and a wastegate coupled across a turbine of a turbocharger, comprising:
    determining, via a controller, an inferred throttle inlet pressure (TIP) based on sensors indicating air flow through the throttle, throttle angle, and manifold absolute pressure (MAP);
    measuring TIP with a TIP sensor positioned upstream of the throttle;
    comparing, via the controller, the inferred TIP to a threshold range of the measured TIP;
    if the inferred TIP is within the threshold range of the measured TIP, adjusting a position of the wastegate via the controller of the engine based on the measured TIP; and
    if the inferred TIP is outside the threshold range of the measured TIP, adjusting the position of the wastegate via the controller based on the inferred TIP.

12. The method of claim 11, wherein inferring TIP based on air flow through the throttle, throttle angle, and MAP further comprises:
    determining the flow through the throttle based on a rate of change of MAP;
    initially assuming the inferred TIP is equal to a lowest possible TIP, wherein the lowest possible TIP is MAP or barometric pressure;
    calculating via the controller a predicted throttle angle based on the lowest possible TIP, flow through the throttle, and MAP;
    determining via the controller a calculated throttle angle based on the assumed TIP, flow through the throttle, and MAP;
    comparing the predicted throttle angle to a commanded throttle angle;
    if the predicted throttle angle is less than or equal to the commanded throttle angle, confirming that the inferred TIP is the lowest possible TIP; and
    if the calculated throttle angle is greater than the commanded throttle angle, incrementally increasing the assumed TIP from the lowest possible TIP and recalculating the predicted throttle angle until the assumed TIP has been incremented to a final assumed TIP value that results in the calculated throttle angle being equal to an actual throttle angle.

13. The method of claim 12, wherein incrementally increasing the assumed TIP comprises incrementally increasing the assumed TIP by an amount based on engine speed measured by an engine speed sensor.

14. The method of claim 11, further comprising if the inferred TIP is outside the threshold range of the measured TIP, performing a rationality check of the TIP sensor to determine if the TIP sensor is degraded.

15. A system, comprising:
    an engine;
    a turbocharger fluidically coupled to the engine;

a wastegate coupled across a turbine of the turbocharger;
a throttle positioned upstream of the engine and controlling air flow to the engine;
a throttle sensor, a throttle angle sensor, and a manifold absolute pressure (MAP) sensor; and
a controller storing non-transitory instructions executable to:
  measure a throttle inlet pressure (TIP) value with a TIP sensor positioned upstream of the throttle;
  calculate via the controller an inferred TIP value and compare it to the measured TIP value from the TIP sensor; and
  if the inferred TIP value is different than the measured TIP value, adjust a position of the wastegate via the controller based on the inferred TIP value.

16. The system of claim 15, wherein the inferred TIP value is calculated based on a throttle model that estimates TIP from throttle angle, air flow through the throttle, and MAP.

17. The system of claim 16, wherein the air flow through the throttle is calculated based on a rate of change of MAP.

* * * * *